United States Patent
Bernardi et al.

(10) Patent No.: US 12,539,562 B2
(45) Date of Patent: Feb. 3, 2026

(54) METHOD FOR PRODUCING A PRECOATED STEEL SHEET AND ASSOCIATED SHEET

(71) Applicant: ArcelorMittal, Luxembourg (LU)

(72) Inventors: Quentin Bernardi, Paris (FR); Tuan A. Mai, Richmond Hill (CA); Nicolaas Van Der Borght, Herent (BE)

(73) Assignee: ArcelorMittal, Luxembourg (LU)

( * ) Notice: Subject to any disclaimer, the term of this patent is extended or adjusted under 35 U.S.C. 154(b) by 307 days.

(21) Appl. No.: 16/757,465

(22) PCT Filed: Oct. 20, 2017

(86) PCT No.: PCT/IB2017/056547
§ 371 (c)(1),
(2) Date: Apr. 20, 2020

(87) PCT Pub. No.: WO2019/077395
PCT Pub. Date: Apr. 25, 2019

(65) Prior Publication Data
US 2021/0107095 A1    Apr. 15, 2021

(51) Int. Cl.
*B23K 26/38* (2014.01)
*B23K 26/12* (2014.01)
(Continued)

(52) U.S. Cl.
CPC ............ *B23K 26/38* (2013.01); *B23K 26/123* (2013.01); *B23K 26/144* (2015.10); *B23K 26/26* (2013.01);
(Continued)

(58) Field of Classification Search
CPC .. C21D 9/50; C23C 28/021; B23K 2101/185; B23K 2103/04; B23K 26/322;
(Continued)

(56) References Cited

U.S. PATENT DOCUMENTS 9,289,855 B2 *  3/2016  Evangelista ............ B32B 15/01
9,597,750 B2 *  3/2017  Canourgues ............ C22C 38/28
(Continued)

FOREIGN PATENT DOCUMENTS

RU          2403309 C2     11/2010
WO     WO2007118939 A1    10/2007

OTHER PUBLICATIONS

Corresponding Search Report for International Application No. PCT/IB2017/056547.

*Primary Examiner* — Vy T Nguyen
*Assistant Examiner* — Abigail H Rhue
(74) *Attorney, Agent, or Firm* — Davidson Kappel LLC

(57) ABSTRACT

A method for producing a precoated steel sheet (1) includes providing a precoated steel strip comprising a steel substrate carrying, on at least one of its faces, a precoating. The precoating includes an intermetallic alloy layer and a metallic alloy layer extending atop the intermetallic alloy layer. The metallic alloy layer is a layer of aluminum, a layer of aluminum alloy or a layer of aluminum-based alloy. The method also includes laser cutting the precoated steel strip so as to obtain at least one precoated steel sheet (1). The precoated steel sheet (1) includes at least one cut edge surface (13). The cut edge surface (13) includes a substrate region (14) and a precoating region (15) and the thickness of the precoated steel sheet (1) being comprised between 1 mm and 5 mm. The laser cutting is carried out such that it results directly in a reduced-aluminum zone (20), extending over the entire height (h) of the cut edge surface (13) and over a length smaller than or equal to the length thereof. The surface fraction of aluminum on the substrate region (14) of the reduced-aluminum zone (20) directly results from the laser cutting operation being comprised between 0.3% and 6%.

27 Claims, 4 Drawing Sheets

(51) Int. Cl.
  *B23K 26/144* (2014.01)
  *B23K 26/26* (2014.01)
  *B23K 26/322* (2014.01)
  *C21D 9/50* (2006.01)
  *C23C 28/02* (2006.01)
  *B23K 101/18* (2006.01)
  *B23K 103/04* (2006.01)

(52) U.S. Cl.
  CPC ............ *B23K 26/322* (2013.01); *C21D 9/505* (2013.01); *C23C 28/021* (2013.01); *B23K 2101/185* (2018.08); *B23K 2103/04* (2018.08); *C21D 2211/001* (2013.01)

(58) Field of Classification Search
  CPC .... B23K 26/26; B23K 26/123; B23K 26/144; B23K 26/38
  See application file for complete search history.

(56) References Cited

U.S. PATENT DOCUMENTS

| | | | |
|---|---|---|---|
| 9,862,058 B2* | 1/2018 | Breuer | C22C 38/22 |
| 10,919,117 B2* | 2/2021 | Cretteur | C21D 1/673 |
| 2008/0011720 A1* | 1/2008 | Briand | B23K 26/32 |
| | | | 219/121.64 |
| 2009/0220815 A1 | 9/2009 | Canourgues et al. | |
| 2012/0012570 A1* | 1/2012 | Briand | B23K 26/06 |
| | | | 219/121.72 |
| 2015/0034615 A1* | 2/2015 | Luzius | B23K 26/142 |
| | | | 219/121.84 |
| 2016/0368094 A1* | 12/2016 | Breuer | B23K 26/26 |
| 2017/0120391 A1 | 5/2017 | Schmit et al. | |

* cited by examiner

METHOD FOR PRODUCING A PRECOATED STEEL SHEET AND ASSOCIATED SHEET

The present disclosure concerns a method for producing a precoated steel sheet from a precoated steel strip comprising a steel substrate having, on at least one of its faces, a precoating, the precoating comprising an intermetallic alloy layer and a metallic alloy layer extending atop the intermetallic alloy layer, the metallic alloy layer being a layer of aluminum, a layer of aluminum alloy or a layer of aluminum-based alloy.

BACKGROUND

Steel parts for motor vehicles can be produced using the following method. First, a precoated steel strip, generally obtained through hot-dip coating, is provided and cut into sheets through laser cutting. Each sheet is then prepared for welding by removing the metallic alloy layer in a removal zone adjacent the cut edge through laser ablation and the thus prepared sheets are laser welded together to create a welded blank. This welded blank is then hot stamped and press-hardened to obtain the final part.

Such steel parts are used in particular in the automotive industry, and more particularly for the manufacturing of anti-intrusion parts, structural parts or parts that contribute to the safety of automotive vehicles.

As is explained in WO 2007/118939, the removal of the metallic alloy layer of the precoating in an edge region of the precoated steel sheet, where it is intended to be welded to another sheet, reduces the aluminum content in the weld metal zone, which, in turn, reduces the formation of either intermetallic compounds or ferrite therein, the intermetallic compounds being sites where incipient cracking is most likely to occur. As a consequence, the mechanical properties of the weld joint are improved in the steel part obtained through this method as compared to a steel part wherein the precoated steel sheets have not been prepared through laser ablation.

SUMMARY

This method of WO 2007/118939, however, not entirely satisfactory.

Indeed, it appears that the mechanical properties, and more particularly the hardness, of the weld joint in the press-hardened part are still not as good as the corresponding properties in the rest of the part, and in particular in the two adjacent steel sheets.

Starting from this observation, the inventors of the present invention have shown that, even though, as mentioned in US 2008/0011720, laser cutting does not displace the coating onto the lateral edge through mechanical action, as is the case with shearing, when carried out under the usual conditions, laser cutting actually results in the pouring of a relatively high amount of aluminum from the coating onto the cut edge surface.

This aluminum, which is not removed by the laser ablation, is introduced into the weld metal zone during laser welding and results in an increased aluminum content in the weld metal zone. Aluminum is a ferrite-forming element in solid solution in the matrix and therefore prevents the transformation into austenite which occurs during the step preceding the hot forming. Consequently, it is no longer possible to obtain a fully martensitic or bainitic structure in the weld joint during the cooling after the hot forming and the weld joint will contain ferrite.

As a result, the weld joint of the steel part exhibits, after press-hardening, a hardness and mechanical strength which are lower than those of the two adjacent sheets.

The inventors of the present invention further observed that, due to the high adhesion of the aluminum which has poured onto the cut edge surface during laser cutting to the substrate of the sheets, mere brushing of the cut edge surface of the sheets prior to welding does not allow sufficiently removing the aluminum traces originating from the cutting operation.

One object of the invention is to provide a method which allows obtaining, with a good productivity, hot-stamped and press-hardened parts from aluminum-precoated welded steel sheets having satisfactory mechanical properties, and in particular wherein the hardness and mechanical strength of the weld joint is at least equal to those of the adjacent sheets.

A method for producing a precoated steel sheet is provided comprising the successive steps of:

providing a precoated steel strip comprising a steel substrate having, on at least one of its main faces, a precoating, the precoating comprising an intermetallic alloy layer and a metallic alloy layer extending atop the intermetallic alloy layer, the metallic alloy layer being a layer of aluminum, a layer of aluminum alloy or a layer of aluminum-based alloy, laser cutting said precoated steel strip so as to obtain at least one precoated steel sheet, said precoated steel sheet comprising a cut edge surface resulting from the cutting operation, the cut edge surface comprising a substrate portion and a precoating portion and the thickness of the precoated steel sheet being comprised between 1 mm and 5 mm, wherein the laser cutting is carried out such that it results directly in a reduced-aluminum zone of the cut edge surface, extending over the entire height of the cut edge surface and over a length smaller than or equal to the length of the cut edge surface (13), the surface fraction of aluminum on the substrate region of the reduced-aluminum zone of the cut edge surface directly resulting from the laser cutting operation being comprised between 0.3% and 6%.

According to particular embodiments, the method according to the invention further comprises one or several of the following features, taken alone or according to any technically possible combination:

over said reduced-aluminum zone of the cut edge surface, the laser cutting is performed with an inert gas as an assist gas, with a laser cutting linear energy greater than or equal to 0.6 kJ/cm, the laser cutting linear energy is greater than or equal to 0.8 kJ/cm, more particularly greater than or equal to 1.0 kJ/cm and even more particularly greater than or equal to 1.2 kJ/cm, the pressure of the assist gas is comprised between 2 and 18 bars, the inert gas is chosen among nitrogen, helium, argon or mixtures of these gases, the laser cutting is performed using a $CO_2$ laser, the laser cutting is performed using a solid-state laser, the solid-state laser is an Nd:YAG type laser, a disk laser, a diode laser or a fiber laser, the thickness of the precoated steel sheet is comprised between 1.0 mm and 3.0 mm, more particularly between 1.0 mm and 2.5 mm, the thickness of the precoating is comprised between 19 µm and 33 µm, the reduced-aluminum zone extends over the entire length of the cut edge surface, the length of the reduced-aluminum zone is strictly smaller than the total length of the cut edge surface.

A method for manufacturing a welded blank is also provided comprising the steps of:

producing a first and a second precoated steel sheet, at least one among the first and the second precoated steel sheets being produced using the method as described above, and butt welding the first and the second precoated steel sheets so as to create a weld joint between said precoated steel sheets and thus obtain a welded blank, whereby the butt welding step includes a step of arranging the first and second precoated steel sheets in such a manner that the reduced-aluminum zone of at least one of the precoated steel sheets faces an edge, and preferably a reduced-aluminum zone, of the other precoated steel sheet.

According to particular embodiments, the method for manufacturing a welded blank further comprises one or more of the following features, taken alone or according to any technically possible combination:

the welding is a laser welding operation, the method further comprises, prior to the butt welding step, a step of removing, for each of the first and second precoated steel sheets, the metallic alloy layer in a removal zone adjacent to a reduced-aluminum of the respective precoated steel sheet and wherein, during the butt welding step, the precoated steel sheets are welded at their edges where the metallic alloy layer has been removed, the removal of the metallic alloy layer is performed using a laser beam, during the removal step, the intermetallic alloy layer is left in the removal zone over at least a portion of its height, the laser welding is performed using a filler wire or powder addition, and the filler wire or powder contains austenite-forming alloying elements.

A method for manufacturing a press-hardened steel part is also provided comprising the steps of:

carrying out the method as described above in order to obtain a welded blank, heating the welded blank so as to obtain an at least partly austenitic structure in the precoated steel sheets forming the welded blank, hot forming the welded blank in a press to obtain a press-formed steel part, and cooling the steel part in the press so as to obtain the press-hardened steel part.

In the method for manufacturing a press-hardened steel part, the cooling rate may be equal to or greater than the critical cooling rate of the steel sheets.

A precoated steel sheet is also provided comprising:

a steel substrate portion having, on at least one of its faces, a precoating portion, the precoating portion including an intermetallic alloy layer portion and a metallic alloy layer portion extending atop the intermetallic alloy layer portion, the metallic alloy layer portion being a layer of aluminum, a layer of aluminum alloy or a layer of aluminum-based alloy, the thickness of the precoated steel sheet being comprised between 1 mm and 5 mm, and at least one laser cut edge surface extending between the faces of the precoated steel sheet and comprising a substrate region and at least one precoating region, wherein the precoated steel sheet comprises, on the laser cut edge surface, a plurality of solidification striations, and wherein the laser cut edge surface comprises a reduced-aluminum zone, extending over the entire height of the laser cut edge surface and over a length smaller than or equal to the length of the laser cut edge surface, the surface fraction of aluminum on the substrate region of the reduced-aluminum zone being comprised between 0.3% and 6%. According to particular embodiments, the precoated steel sheet comprises one of the following features:

the reduced-aluminum zone extends over the entire length of the cut edge surface, the length of the reduced-aluminum zone is strictly smaller than the total length of the cut edge surface.

BRIEF DESCRIPTION OF THE DRAWINGS

The invention will be better understood upon reading the following specification, given only by way of example and with reference to the appended drawings, wherein.

DETAILED DESCRIPTION

The present disclosure relates to a method for producing a precoated steel sheet 1.

Figure 1:
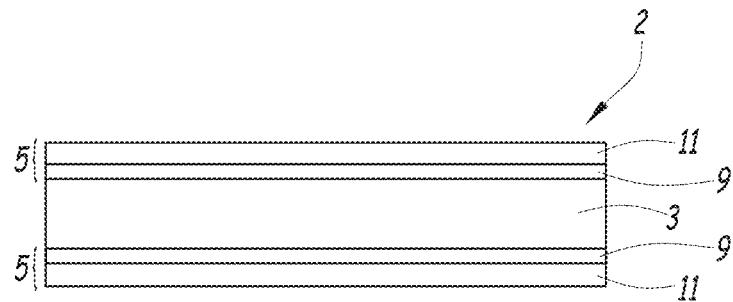
FIG. 1 is a schematic cross-sectional view of a precoated steel strip, taken perpendicular to the longitudinal direction of the strip.

The method comprises a first step of providing a precoated steel strip 2, as shown in cross-section in FIG. 1.

As shown in FIG. 1, the precoated steel strip 2 comprises a metallic substrate 3 having, on at least one of its faces, a precoating 5. The precoating 5 is superimposed on the substrate 3 and in contact therewith.

The metallic substrate 3 is more particularly a steel substrate.

The steel of the substrate 3 is more particularly a steel having a ferrito-perlitic microstructure.

The substrate 3 is advantageously made of a steel intended for thermal treatment, more particularly a press-hardenable steel, and for example a manganese-boron steel, such as a 22MnB5 type steel.

According to one embodiment, the steel of the substrate 3 comprises, by weight:

$0.10\% \leq C \leq 0.5\%$ $0.5\% \leq Mn \leq 3\%$ $0.1\% \leq Si \leq 1\%$ $0.01\% \leq Cr \leq 1\%$ $Ti \leq 0.2\%$ $Al \leq 0.1\%$ $S \leq 0.05\%$ $P \leq 0.1\%$ $B \leq 0.010\%$ the rest being iron and impurities resulting from manufacturing.

More particularly, the steel of the substrate 3 comprises, by weight:
0.15%≤C≤0.25%
0.8%≤Mn≤1.8%
0.1%≤Si≤0.35%
0.01%≤Cr≤0.5%
Ti≤0.1%
Al≤0.1%
S≤0.05%
P≤0.1%
B≤0.005%
the rest being iron and impurities resulting from manufacturing.

According to an alternative, the steel of the substrate 3 comprises, by weight:
0.040%≤C≤0.100%
0.80%≤Mn≤2.00%
Si≤0.30%
S≤0.005%
P≤0.030%
0.010%≤Al≤0.070%
0.015%≤Nb≤0.100%
Ti≤0.080%
N≤0.009%
Cu≤0.100%
Ni≤0.100%
Cr≤0.100%
Mo≤0.100%
Ca≤0.006%,
the rest being iron and impurities resulting from manufacturing.

According to an alternative, the steel of the substrate 3 comprises, by weight:
0.24%≤C≤0.38%
0.40%≤Mn≤3%
0.10%≤Si≤0.70%
0.015%≤Al≤0.070%
0%≤Cr≤2%
0.25%≤Ni≤2%
0.015%≤Ti≤0.10%
0%≤Nb≤0.060%
0.0005%≤B≤0.0040%
0.003%≤N≤0.010%
0.0001%≤S≤0.005%
0.0001%≤P≤0.025%
wherein the titanium and nitrogen contents satisfy the following relationship:
Ti/N>3.42,
and the carbon, manganese, chromium and silicon contents satisfy the following relationship:

$$2.6C + \frac{Mn}{5.3} + \frac{Cr}{13} + \frac{Si}{15} \geq 1.1\%,$$

the steel optionally comprising one or more of the following elements:
0.05%≤Mo≤0.65%
0.001%≤W≤0.30%%
0.0005%≤Ca≤0.005%
the rest being iron and impurities inevitably resulting from manufacturing.

The substrate 3 may be obtained, depending on its desired thickness, by hot rolling and/or by cold-rolling followed by annealing, or by any other appropriate method.

The substrate 3 advantageously has a thickness comprised between 1.0 mm and 5 mm, more particularly comprised between 1.0 mm and 3.0 mm, more particularly between 1.0 and 2.5 mm, and even more particularly between 1.2 mm and 2.5 mm.

The precoating 5 is obtained by hot-dip coating, i.e. by immersion of the substrate 3 into a bath of molten metal. It comprises an intermetallic alloy layer 9 in contact with the substrate 3 and a metallic alloy layer 11 extending atop the intermetallic alloy layer 9.

The intermetallic alloy layer 9 is formed by reaction between the substrate 3 and the molten metal of the bath. It comprises an intermetallic compound comprising at least one element from the metallic alloy layer 11 and at least one element from the substrate 3.

The thickness of the intermetallic alloy layer 9 is generally of the order of a few micrometers. In particular, its mean thickness is typically comprised between 2 and 7 micrometers.

The metallic alloy layer 11 has a composition which is close to that of the molten metal in the bath. It is formed by the molten metal carried away by the strip as it travels through the molten metal bath during hot-dip coating.

The metallic alloy layer 11 has, for example, a thickness comprised between 19 μm and 33 μm or between 10 μm and 20 μm.

The metallic alloy layer 11 is a layer of aluminum, or a layer of aluminum alloy or a layer of aluminum-based alloy.

In this context, an aluminum alloy refers to an alloy comprising more than 50% by weight of aluminum. An aluminum-based alloy is an alloy in which aluminum is the main element, by weight.

The intermetallic alloy layer 9 comprises intermetallic compounds of the $Fe_x$—$Al_y$ type, and more particularly $Fe_2Al_5$.

The particular structure of the precoating 5 obtained by hot-dip coating is in particular disclosed in patent EP 2 007 545.

According to one embodiment, the metallic alloy layer 11 is a layer of aluminum alloy further comprising silicon.

According to one example, the metallic alloy layer 11 comprises, by weight:
8%≤Si≤11%,
2%≤Fe≤4%,
the rest being aluminum and possible impurities.

Advantageously, and as illustrated in FIG. 1, the substrate 3 is provided with a precoating 5 as described above on both of its faces.

The method for producing the precoated steel sheet 1 further comprises a step of cutting said precoated steel strip 2 through laser cutting so as to obtain at least one precoated steel sheet 1.

Figure 2:
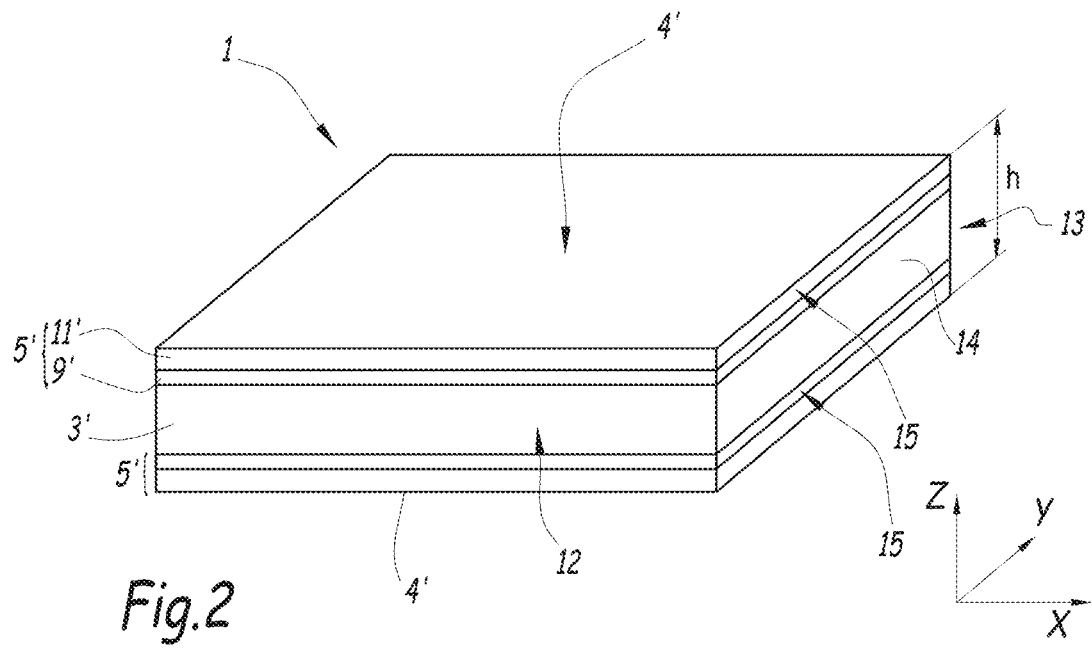
FIG. 2 is a schematic perspective view of a precoated steel sheet.

FIG. 2 is a perspective schematic drawing of such a precoated steel sheet 1.

The precoated steel sheet 1 comprises a substrate portion 3' and at least one precoating portion 5', the precoating portion 5' including an intermetallic alloy layer portion 9' and a metallic alloy layer portion 11'.

The precoated steel sheet 1 further comprises two main opposite faces 4' and a peripheral edge 12 extending between the faces 4' around the periphery of the sheet 1. The length of the peripheral edge 12 is equal to the perimeter of the sheet 1. The height h of the peripheral edge 12 is equal to the thickness of the sheet 1.

In the context of this patent application, the height of an element is the dimension of this element taken along the direction of the thickness of the precoated sheet 1 (z direction in the figures).

The peripheral edge 12 extends substantially perpendicular to the faces 4'. In this context, "substantially" means that the peripheral edge 12 extends at an angle comprised between 65° and 90° relative to one of the faces 4'. The angle of the peripheral edge 12 relative to the faces 4' may vary along the periphery of the sheet 1.

In the example shown in FIG. 2, the peripheral edge 12 has a substantially rectangular contour comprising four rectilinear sides. However, any other contour may be used, depending on the application.

The peripheral edge 12 comprises a cut edge surface 13 resulting from the laser cutting operation.

The cut edge surface 13 extends between the faces 4' of the precoated steel sheet 1 from one face 4' to the other. It extends over the entire height h of the peripheral edge 12.

The cut edge surface 13 includes at least one substantially planar portion.

Advantageously, the precoated steel sheet 1 is obtained by laser cutting along its entire contour. In this case, the peripheral edge 12 consists of the cut edge surface 13. The cut edge surface 13 thus extends around the entire periphery of the sheet 1. According to an alternative, the cut edge surface 13 extends only over a fraction of the length of the peripheral edge 12. In this case, the rest of the peripheral edge 12 may coincide with the original lateral edges of the strip 2.

In the context of this patent application, the length of an element is the dimension of this element in the plane of a given face 4' of the precoated steel strip 2. The length of the cut edge surface 13 therefore in particular corresponds to the dimension of the cut edge surface 13 along the path of the laser beam during laser cutting.

Figure 3:
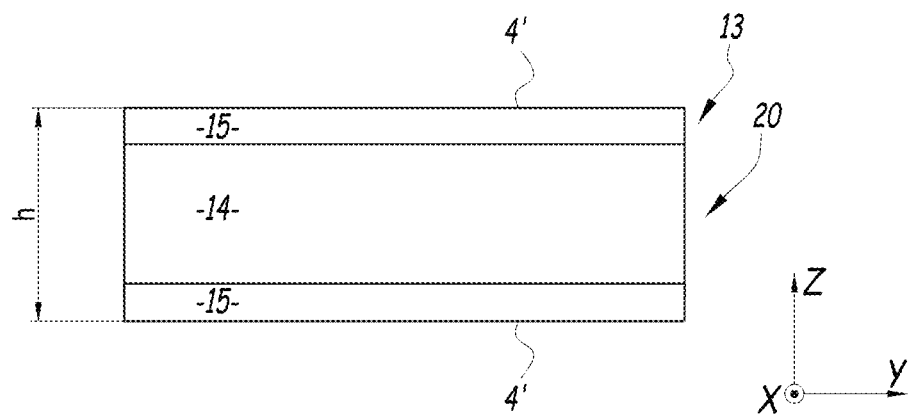
FIG. 3 is a schematic side view of the precoated steel sheet of FIG. 2.

As can be seen in FIGS. 2 and 3, the cut edge surface 13 comprises a substrate region 14 and at least one precoating region 15. The substrate region 14 corresponds to the surface of the substrate 3' located at the cut edge surface 13. It consists essentially of the material of the substrate 3. The precoating region 15 corresponds to the surface of the precoating 5' located at the cut edge surface 13. It consists essentially of the material of the precoating 5'.

The thickness of the precoated steel sheet 1 is identical to that of the precoated steel strip 2. It is comprised between 1.0 mm and 5 mm, more particularly comprised between 1.0 mm and 3.0 mm, more particularly between 1.0 mm and 2.5 mm, and even more particularly between 1.2 and 2.5 mm.

During the laser cutting step, a laser beam of a laser cutting device is applied to the steel strip 2 along a predetermined path so as to obtain the cut edge surface 13. This predetermined path extends in the plane of a face 4' of the sheet 1.

Figure 5:
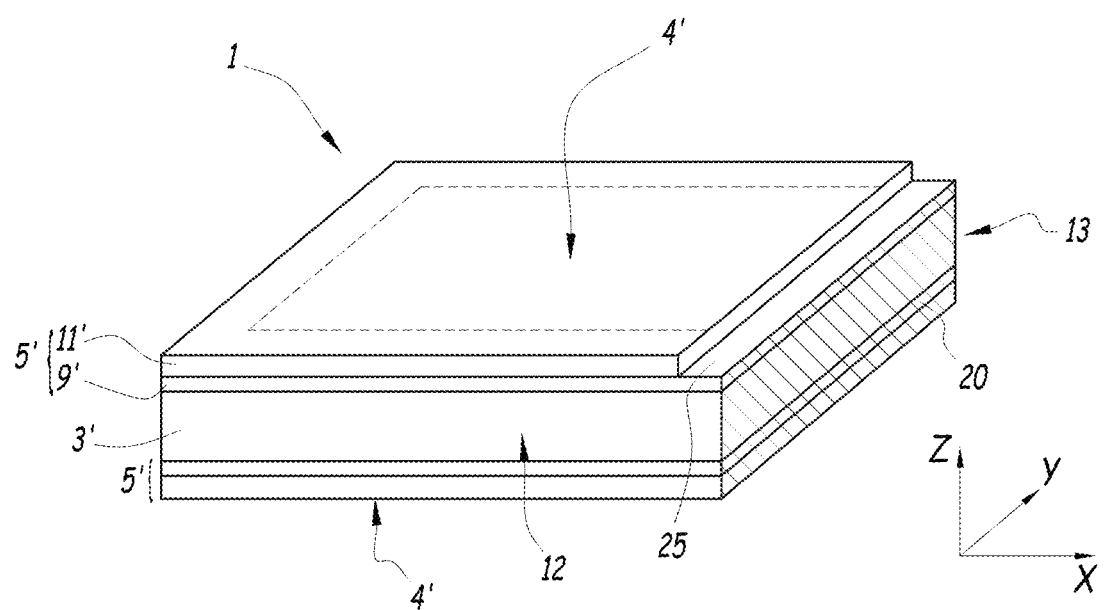
FIG. 5 is a schematic perspective view of a precoated steel sheet comprising a removal zone.

According to the present disclosure, and a shown in FIGS. 3 and 5, the cut edge surface 13 comprises a reduced-aluminum zone 20 extending over at least a fraction of the length of the cut edge surface 13.

The reduced-aluminum zone 20 results directly from the laser cutting operation.

As shown in FIG. 3, the reduced-aluminum zone 20 extends over the entire height of the cut edge surface 13 and over a length that is smaller than or equal to the total length of the cut edge surface 13.

Advantageously, the reduced-aluminum zone 20 extends over a length equal to at least 3 mm, and more particularly over at least 10 mm.

The reduced-aluminum zone 20 of the cut edge surface 13 preferably includes at least one substantially planar portion. For example, in the example shown in FIG. 2, in which the precoated steel sheet 1 has a rectangular contour, the reduced-aluminum zone 20 of the cut edge surface 13 extends over one or more sides of the rectangle.

According to one embodiment of the invention, the reduced-aluminum zone 20 extends over the entire cut edge surface 13. In this case, the reduced-aluminum zone 20 coincides with the cut edge surface 13 and the length of the reduced-aluminum zone 20 is equal to the length of the cut edge surface 13.

According to another embodiment, the reduced-aluminum zone 20 extends only over a portion of the length of the cut edge surface 13. For example, the reduced-aluminum zone 20 extends only over one substantially planar portion of the cut edge surface 13. For example, in the case where the precoated steel sheet 1 has a rectangular contour, the reduced-aluminum zone 20 of the cut edge surface 13 may extend over only some of the sides of the rectangle, and for example over only one side of the rectangle.

Preferably, the reduced-aluminum zone 20 forms an edge of the precoated steel sheet 1 intended to be welded to another precoated steel sheet. In this case, the reduced-aluminum zone 20 is intended to be incorporated in the weld joint.

According to the present disclosure, during the laser cutting step, laser cutting is carried out in such a way that the surface fraction of aluminum on the substrate region 14 of the reduced-aluminum zone 20 directly resulting from the laser cutting operation is comprised between 0.3% and 6%.

In this context, "directly resulting" in particular means that the fraction or ratio of aluminum is measured immediately after the laser beam of the laser cutting device has cut the precoated steel sheet 1 from the precoated steel strip 2, and in particular before any further step is carried out on the cut edge surface 13 of the precoated steel sheet 1, for example before a possible finishing step of the cut edge surface 13, such as brushing, machining, milling, sandblasting or stripping.

The surface fraction of aluminum on the substrate region 14 of the reduced-aluminum zone 20 of cut edge surface 13 of the precoated steel sheet 1 may be determined as follows:

the substrate region 14 of the reduced-aluminum zone 20 of the cut edge surface 13 is imaged using scanning electron microscopy;

the information obtained from the scanning electron microscopy is processed to obtain an EDS (Energy Dispersive X-Ray Spectroscopy) image showing, among all alloying elements, only the aluminum present on the considered substrate region 14. For example, the image is treated in such a manner that the aluminum traces present on the considered substrate region 14 appear in a colour, such as red, strongly contrasting with a black background. As a result of the laser displacement during cutting, aluminum appears as inclined dripping traces.

Figure 4:
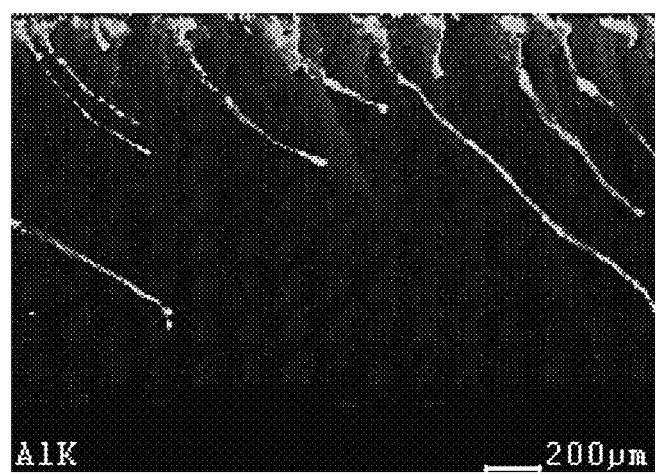
FIG. 4 is an image of the cut edge surface, showing, in white, the aluminum traces present on the substrate region resulting from the laser cutting operation.

An example of such an EDS image is shown in FIG. 4. In this black and white picture, the aluminum traces, which might otherwise appear in red, appear in white on a black background.

the thus obtained EDS image is then processed through image processing in order to determine the surface fraction of aluminum in the image.

For this purpose, the number N of pixels corresponding to aluminum, i.e. for example the number of red pixels, in the EDS image of the considered substrate region 14 is measured using image processing.

The number N of pixels corresponding to aluminum may be determined as follows. For each pixel in the EDS image, a threshold is set on the value of the red RGB parameter so as to determine whether this pixel is to be considered as red, i.e. as an aluminum pixel, or not. In particular, the threshold T is set to $$T = \frac{255}{3},$$

such that, if the value of the red RGB parameter of a pixel is greater than the threshold T, this pixel will be considered to be a red pixel for the purposes of this analysis. For example, this image processing may be performed through a conventional image treatment analysis software known per se, such as for example the Gimp image analysis software.

The surface fraction of aluminum in the substrate region 14 of the reduced-aluminum zone 20 is then obtained by dividing the number N of thus measured aluminum pixels, i.e. for example red pixels, by the total number of pixels in the image of the considered substrate region 14.

The laser cutting is carried out using an inert gas as an assist gas. The inert gas is for example chosen among nitrogen, argon, helium or mixtures thereof such as nitrogen/argon, nitrogen/helium, argon/helium or nitrogen/helium/argon mixtures.

The laser is advantageously a continuous laser.

In order to obtain the reduced-aluminum zone 20, the laser cutting may be performed, over the reduced-aluminum zone 20, with a linear energy greater than or equal to 0.6 kJ/cm.

The laser cutting linear energy corresponds to the amount of energy sent by the laser beam during laser cutting per unit length. It can be calculated by dividing the power of the laser beam by the cutting speed.

The inventors discovered that, when a zone 20 of the cut edge surface 13 is produced using the above laser cutting parameters, the surface fraction of aluminum on the substrate region 14 of this zone 20 of the cut edge surface 13 is comprised between 0.3% and 6%.

Advantageously, for obtaining the reduced-aluminum zone 20, the laser cutting linear energy is greater than or equal to 0.8 kJ/cm, more particularly greater than or equal to 1.0 kJ/cm and even more particularly greater than or equal to 1.2 kJ/cm. In particular, the inventors of the present invention have observed that even better results in terms of reduction of the surface fraction of aluminum in the reduced-aluminum zone 20 can be obtained with increasing laser cutting linear energy.

Preferably, the assist gas pressure is comprised between 2 bars and 18 bars, more preferably between 6 bars and 18 bars, and even more preferably between 10 bars and 18 bars.

For example, for obtaining the reduced-aluminum zone 20, laser cutting is carried out over the reduced-aluminum zone 20 using a laser cutting linear energy greater than or equal to 0.8 kJ/cm and an assist gas pressure comprised between 2 bars and 18 bars.

According to another example, for obtaining the reduced-aluminum zone 20, laser cutting is carried out over the reduced-aluminum zone 20 using a laser cutting linear energy greater than or equal to 1.0 kJ/cm and an assist gas pressure comprised between 2 bars and 18 bars.

According to a further example, for obtaining the reduced-aluminum zone 20, laser cutting is carried out over the reduced-aluminum zone 20 using a laser cutting linear energy greater than or equal to 1.0 kJ/cm and a pressure comprised between 10 bars and 18 bars.

According to one embodiment, the laser cutting step is carried out using a $CO_2$ laser.

The $CO_2$ laser is advantageously a continuous laser.

The $CO_2$ laser for example has a power comprised between 2 kW and 7 kW, and preferably between 4 kW and 6 kW.

For example, for obtaining the reduced-aluminum zone 20, laser cutting is carried out over the reduced-aluminum zone 20 using a continuous $CO_2$ laser with nitrogen as an assist gas, at a cutting speed of 4 m/min and with a laser power of 4 kW, which corresponds to a laser cutting linear energy of 0.6 kJ/cm. The pressure of the assist gas is for example equal to 14 bars.

According to another example, for obtaining the reduced-aluminum zone 20, laser cutting is carried out over the reduced-aluminum zone 20 using a continuous $CO_2$ laser with nitrogen as an assist gas, at a cutting speed of 2 m/min and with a laser power of 4 kW, which corresponds to a laser cutting linear energy of 1.2 kJ/cm. The pressure of the assist gas is for example equal to 14 bars.

According to another embodiment, the laser cutting step is carried out using a solid-state laser. The solid state laser is for example an Nd:YAG (neodymium-doped yttrium aluminium garnet) laser, a fiber laser, a diode laser or a disk laser.

The solid state laser for example has a power comprised between 2 kW and 15 kW, preferably between 4 kW and 12 kW, more preferably between 4 kW and 10 kW, and even more preferably between 4 and 8 kW.

By way of example, for obtaining the reduced-aluminum zone 20, laser cutting is performed over the reduced-aluminum zone 20 using a fiber laser having a power of 6 kW with nitrogen as an assist gas. In this example, the cutting speed is for example equal to 5 m/min, corresponding to a laser cutting linear energy equal to 0.72 kJ/cm.

Optionally, the method for manufacturing a precoated steel sheet 1 comprises a step of brushing at least the reduced-aluminum zone 20 of the cut edge surface 13, for example directly after performing the laser cutting. Even though, as mentioned previously, brushing alone does not allow sufficiently removing the aluminum traces resulting from laser cutting on the cut edge surface 13, it may be used in addition to the laser cutting step according to the present disclosure in order to even further reduce the aluminum fraction on the cut edge surface 13.

In the case where the reduced-aluminum zone 20 extends over the entire length of the cut edge surface 13, the same laser cutting parameters, in particular the same linear energy and the same assist gas pressure, may be used over the entire length of the cut edge surface 13, i.e. throughout the cutting step.

In the case where the reduced-aluminum zone 20 extends over only a portion of the length of the cut edge surface 13, different laser cutting parameters, and in particular a different linear energy, resulting from a different cutting speed, may be used for obtaining the reduced-aluminum zone 20 and for obtaining the rest of the cut edge surface 13. In particular, the laser cutting speed may be changed over the length of the cut edge surface 13, a first cutting speed being used for obtaining the reduced-aluminum zone 20 and a second cutting speed, different from the first cutting speed, being used for obtaining the rest of the cut edge surface 13.

For example, for a same laser beam, i.e. in particular for a same laser type and power, a higher cutting speed may be used outside of the reduced-aluminum zone 20 of the cut edge surface 13 than when producing this zone 20. In this case, the laser cutting linear energy will be smaller outside of the reduced-aluminum zone 20, resulting in a higher surface fraction of aluminum over the substrate region 14 in this region of the cut edge surface 13 than in the reduced-aluminum zone 20.

Such an adjustment of the laser cutting parameters during the cutting step may be carried out automatically by the laser cutting device. It may also be carried out manually by an operator.

For example, the reduced-aluminum zone 20 corresponds to a weld edge of the precoated steel sheet 1, i.e. to a zone of the peripheral edge 12 where the precoated steel sheet 1 is intended to be welded to another steel sheet. In this case, the reduced-aluminum zone 20 is intended to be incorporated in the weld joint.

The embodiment in which the reduced-aluminum zone 20 corresponds to a weld edge of the precoated steel sheet 1 is particularly advantageous in the case where the precoated steel sheet 1 resulting from the laser cutting operation is only intended to be welded to another steel sheet over said reduced-aluminum zone 20 of the cut edge surface 13. Indeed, in such a case, it results in the same advantages as regards the hardness of the weld joint as when the reduced-aluminum zone 20 extends over the entire length of the cut edge surface 13. However, the productivity can be increased even more, since, for a same laser power, a greater laser cutting speed may be used in regions which are not intended to be part of a weld joint and where, as a consequence, the control of the surface fraction of aluminum is not as important as in the reduced-aluminum zone 20 which is intended to be part of a weld joint.

The present disclosure also relates to a precoated steel sheet 1, which may be obtained using the method disclosed above. This precoated steel sheet 1 has been described above with reference to FIG. 2.

The use of laser cutting results in a particular geometry of the cut edge surface 13. Indeed, it results in a fusion of the material of the substrate 3 and of the precoating 5 at the cut edge surface 13, which then resolidifies creating solidification striations, also called solidification ripples, whose spacing depends, in particular, on the laser cutting speed, the nature and the pressure of the assistance gas. Therefore, the precoated steel sheet 1 comprises, on the cut edge surface 13, including in the reduced-aluminum zone 20, a plurality of solidification striations or ripples.

Furthermore, the precoated steel sheet 1 comprises a heat affected zone at the cut edge surface 13. This heat affected zone results from the heating of the cut edge surface 13 during laser cutting. It may be observed through conventional means for detecting the presence of a heat affected zone, for example through micro- or nano-hardness measurements or through metallographic observations after adapted etching.

Furthermore, the precoated steel sheet 1 has a surface fraction of aluminum on the substrate region 14 of the reduced-aluminum zone 20 comprised between 0.3% and 6%.

The present disclosure—also relates to a method for manufacturing a welded blank, comprising the steps of:
producing a first and a second precoated steel sheet 1, at least one among the first and the second precoated steel sheets 1, and preferably the first and the second precoated steel sheets 1, being produced using the method as disclosed above;
butt welding the first and the second precoated steel sheets 1 in order to create a weld joint between said steel sheets 1 and obtain a welded blank.

The butt welding step includes a step of arranging the first and second precoated steel sheets 1 in such a manner that the reduced-aluminum zone 20 of at least one of the precoated sheets 1 faces an edge, and preferably a reduced-aluminum zone 20, of the other sheet 1.

The weld joint between said first and second precoated steel sheets 1 is obtained from the melting of their facing edges, and in particular between two reduced-aluminum zones 20 thereof.

The welding is advantageously a laser welding.

The welding may be an autogenous welding, i.e. without adding a filler material, for example in the form of a wire or a powder.

According to an alternative, the welding is carried out using an adequate filler material, for example a filler wire or powder. The filler wire or powder in particular includes austenite-forming elements so as to balance the ferrite-forming and/or the intermetallic compound forming effect of the aluminum from the precoating 5'.

Advantageously, as shown in FIG. 5, prior to butt welding, for each of the precoated steel sheets 1, the metallic alloy layer 11' is removed on at least one face 4' of the precoated steel sheet 1 over a removal zone 25 that is adjacent to the reduced-aluminum zone 20 of the considered precoated steel sheet 1 and, during the butt welding step, the precoated steel sheets 1 are welded at the respective edges from which the metallic alloy layer 11' has been removed.

The removal of the metallic alloy layer 11' is advantageously carried out through laser ablation as disclosed in prior application WO 2007/118939.

The width of the removal zone 25 on each of the steel sheets 1 is for example comprised between 0.2 and 2.2 mm.

Preferably, the removal step is carried out so as to remove only the metallic alloy layer 11' while leaving the intermetallic alloy layer 9'. Therefore, the intermetallic alloy layer 9' is left in the removal zone over at least a portion of its height. In this case, the residual intermetallic alloy layer 9' protects the areas of the welded blank immediately adjacent to the weld joint from oxidation and decarburization during subsequent hot-forming steps, and from corrosion during the in-use service.

Optionally, the method for manufacturing a welded blank comprises a step of brushing the edge of the precoated steel sheet 1 that is to be welded of at least one among the first and the second precoated steel sheets 1, and preferably both the first and the second precoated steel sheets 1, prior to carrying out the welding step.

If the method includes the removal of the metallic alloy layer 11' prior to welding, brushing is preferably carried out after this removal step. In this case, the brushing removes the aluminum traces that may have spattered, during the removal operation, onto the edge of the sheet 1 that is to be welded. Such a spattering may in particular occur when the removal is performed through laser ablation. Such spatter has a relatively low adherence to the edge and can therefore be removed relatively easily through brushing. Brushing may therefore further reduce the aluminum content in the weld joint.

The present disclosure also relates to a method for manufacturing a press-hardened steel part comprising the steps of:

producing a welded blank using the method as disclosed above;

heating the welded blank so as to obtain an at least partly austenitic structure in the steel sheets 1 forming the welded blank;

hot forming the welded blank in a press so as to obtain a press-formed steel part; and cooling the steel part in the press so as to obtain the press-hardened steel part.

More particularly, the welded blank is heated to a temperature that is greater than the upper austenite transformation temperature Ac3 of the steel sheets 1.

During the cooling step, the cooling rate is advantageously equal to or greater than the critical martensitic or bainitic cooling rate of the steel sheets.

The inventors of the present invention have carried out the following experiments.

Precoated steel sheets 1 were cut from precoated steel strips 2 through laser cutting using a $CO_2$ laser with nitrogen as an assist gas and using different laser cutting linear energies. The precoated steel sheets 1 had a rectangular shape.

For each laser cutting linear energy, the inventors measured the surface fraction of aluminum on the substrate region 14 of the cut edge surface 13.

The measurements were performed based on images of the considered edge surface taken with a scanning electron microscope using the following parameters:

magnification: ×60 analysis length: 3 mm;

electron beam energy: between 15 and 25 keV.

The experiments were carried out using a $CO_2$ laser having a power of 4 kW. The nitrogen pressure was comprised between 2 and 18 bars.

The precoated steel strips 2 were strips having the compositions and precoatings as disclosed above.

More particularly, the steel of the strip 2, comprised, in weight %:

C: 0.22%

Mn: 1.16%

Al: 0.03%

Si: 0.26%

Cr: 0.17%

B: 0.003%

Ti: 0.035%

S: 0.001%

N: 0.005% the rest being iron and possible impurities resulting from elaboration.

This steel is known under the commercial name Usibor 1500.

The precoating 5 has been obtained by hot-dip coating the steel strip 2 in a bath of molten metal.

The metallic alloy layer of the precoating 5 comprised, by weight:

Si: 9%

Fe: 3%, the rest consisting of aluminum and possible impurities resulting from elaboration.

The metallic alloy layer had an average total thickness of 20 μm.

The intermetallic alloy layer contained intermetallic compounds of the $Fe_x$—$Al_y$ type, and majoritarily $Fe_2Al_3$, $Fe_2Al_5$ and $Fe_xAl_ySi_z$. It has an average thickness of 5 μm.

The strip had a thickness of 1.5 mm.

Figure 6:
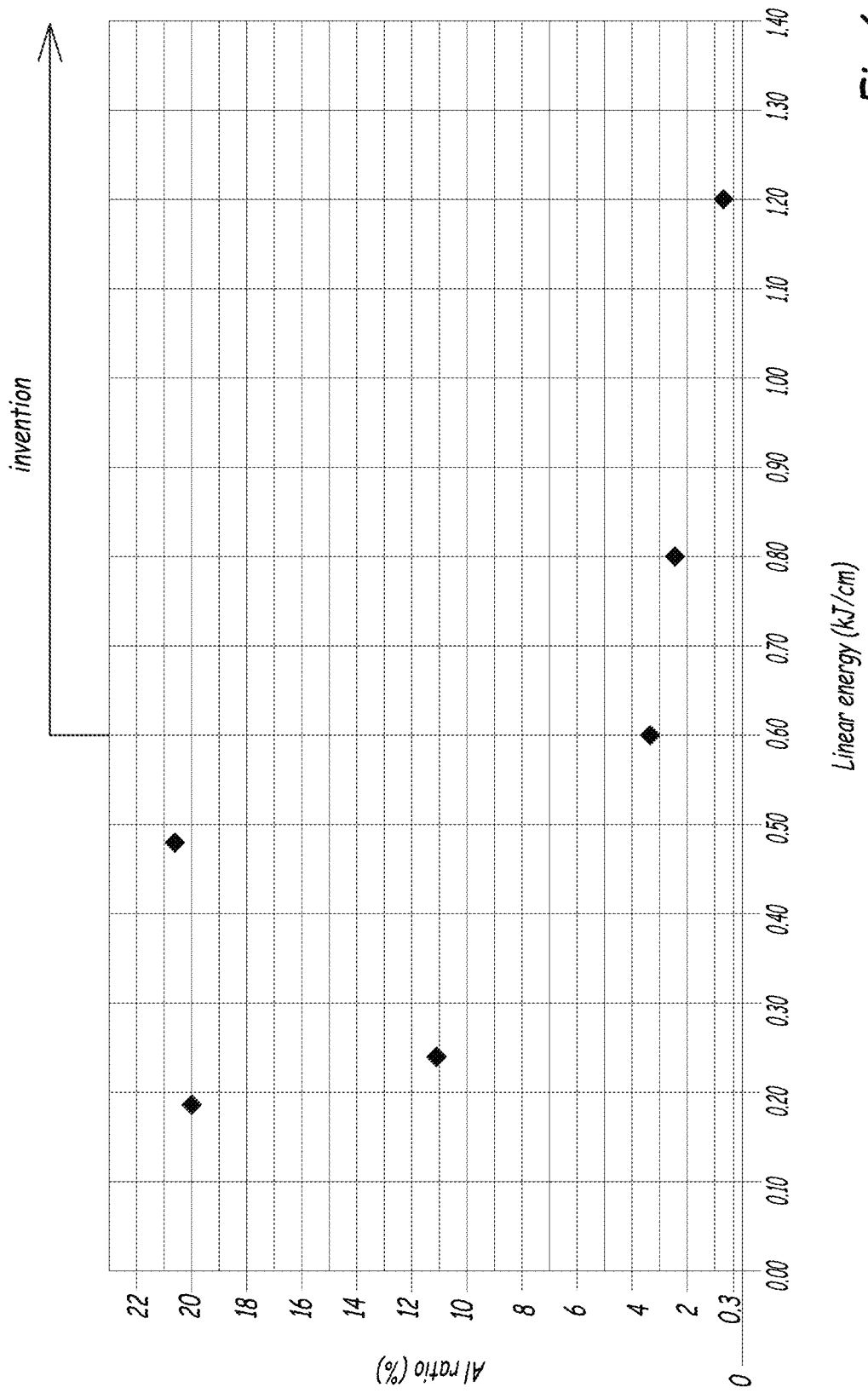
FIG. 6 is a graph showing the surface fraction of aluminum on the substrate region of the cut edge surface as a function of laser cutting linear energy.

FIG. 6 is a graph of the surface fraction of aluminum (Al ratio) on the substrate region 14 of the considered edge surface 13 of the precoated steel sheet 1 as a function of laser cutting linear energy in this series of experiments.

As can be seen on FIG. 6, for a laser cutting linear energy strictly smaller than 0.6 kJ/cm, the surface fraction of aluminum on the substrate region 14 of the considered edge surface 13 resulting from the laser cutting is strictly greater than 6%.

On the contrary, for a laser cutting linear energy equal to or greater than 0.6 kJ/cm, the aluminum surface fraction on the cut edge surface 13 becomes smaller than or equal to about 6%. It is further greater than or equal to 0.3 kJ/cm.

For a linear cutting energy equal to 1.20 kJ/cm, the surface fraction of aluminum on the substrate region 14 of the cut edge surface 13 is even comprised between 0.3% and 4.5%.

Therefore, the inventors found in an unexpected manner that laser cutting the precoated steel strip 2 with cutting linear energies equal to or greater than 0.6 kJ/cm results in particularly low amounts of aluminum being deposited on the cut edge surface 13 due to the laser cutting operation.

The inventors have further observed that analogous results can be obtained when using other types of inert gas, and in particular argon.

The inventors further carried out experiments in which two precoated steel sheets 1 according to embodiments of the invention were butt-welded together through autogenous laser welding, i.e. without filler material, in order to obtain a welded blank and the thus obtained welded blank was hot-formed and press-hardened to produce a press-hardened steel part.

Hardness measurements carried out on the weld joint of the thus obtained steel parts show that the weld joint has a hardness which is higher than the hardness which would be obtained when using precoated steel sheets which are not according to embodiments of the invention, and which, for example have been obtained through laser cutting with a smaller laser cutting linear energy.

The method according to embodiments of the invention is therefore advantageous since no relative hardness drop is experienced in the weld.

Indeed, due to fact that the aluminum fraction can be made smaller than or equal to 6% on the edge surface that is to be welded to the other precoated steel sheet, press-hardened steel parts obtained from such precoated steel sheets will have improved mechanical properties as compared to precoated steel sheets having a surface fraction of aluminum which is greater than 6% on their edge surfaces.

Moreover, obtaining a surface fraction of aluminum smaller than 0.3% on the substrate region 14 of the edge surface would be too costly from an economic point of view.

Particularly satisfactory mechanical properties of the weld joint can be obtained if, prior to welding, the coating of the precoated steel sheets 1 is at least partially removed along the edges that are to be welded as has been described previously or when a filler wire or powder comprising austenite-forming elements is used. Such mechanical properties are particularly important if the parts are intended to form anti-intrusion parts, structural parts or parts that contribute to the safety of automotive vehicles.

Furthermore, such parts can be obtained with a high productivity, since no additional operations are needed in order to remove the traces of aluminum present on the cut edge surface prior to the welding operation.

The method according to the present disclosure is further particularly advantageous as regards the productivity increase, since it allows for a significant reduction in the amount of aluminum present on the substrate region 14 of the cut edge surface due to laser cutting only by controlling the laser cutting linear energy in a given range.

It is particularly interesting to use nitrogen, argon, either pure or in the form of argon/nitrogen mixtures as assist gases, since these gases are relatively inexpensive, in particular compared to helium. Mixtures of nitrogen and/or argon with helium are also interesting, since they are less expensive than pure helium.

The fact that controlling the linear energy during laser cutting within a predetermined range reduces the amount of aluminum on the substrate region 14 of the cut edge surface 13 is entirely unexpected. Furthermore, it is unexpected that the overall productivity could be improved while using a linear energy for the laser cutting that is, in fact, greater than the linear energies that would usually be implemented. Indeed, for a same laser power, the increased linear energy can only be obtained through a relative decrease in the cutting speed.

What is claimed is:

1. A method for producing a precoated steel sheet comprising the successive steps of:
   providing a precoated steel strip comprising a steel substrate having, on at least one main face, a precoating, the precoating comprising an intermetallic alloy layer and a metallic alloy layer extending atop the intermetallic alloy layer, the metallic alloy layer being a layer of aluminum, a layer of aluminum alloy or a layer of aluminum-based alloy;
   laser cutting the precoated steel strip so as to obtain at least two precoated steel sheets, each precoated steel sheet comprising a cut edge surface resulting from the cutting operation, each cut edge surface comprising a substrate portion and a precoating portion and a thickness of each of the precoated steel sheet being comprised between 1 mm and 5 mm,
   the laser cutting being carried out such that the laser cutting results directly in a reduced-aluminum zone of each cut edge surface, extending over an entire height of each cut edge surface and over a length smaller than or equal to a length of each cut edge surface, a surface fraction of aluminum on a substrate region of the reduced-aluminum zone of each cut edge surface directly resulting from the laser cutting operation being comprised between 0.3% and 6%, the substrate region of each reduced aluminum zone extending over the entire thickness of the steel substrate,
   the precoating portion including a portion of the intermetallic alloy layer and a portion of the metallic alloy layer.

2. The method according to claim 1, wherein, over the reduced-aluminum zone of each cut edge surface, the laser cutting is performed with an inert gas as an assist gas, with a laser cutting linear energy greater than or equal to 0.6 kJ/cm.

3. The method according to claim 2, wherein the pressure of the assist gas is comprised between 2 and 18 bars.

4. The method according to claim 2, wherein the inert gas is chosen among nitrogen, helium, argon or mixtures of these gases.

5. The method according to claim 2, wherein the laser cutting is performed using a CO2 laser.

6. The method according to claim 1, wherein the laser cutting is performed using a solid-state laser.

7. The method according to claim 6, wherein the solid-state laser is an Nd:YAG type laser, a disk laser, a diode laser or a fiber laser.

8. The method according to claim 1, wherein the thickness of each precoated steel sheet is comprised between 1.0 mm and 3.0 mm.

9. The method according to claim 1, wherein the thickness of each precoated steel sheet is comprised between 1.0 mm and 2.5 mm.

10. The method according to claim 1, wherein the thickness of each precoating is comprised between 19 μm and 33 μm.

11. The method according to claim 1, wherein each reduced-aluminum zone extends over the entire length of the respective cut edge surface.

12. The method according to claim 1, wherein the length of each reduced-aluminum zone is strictly smaller than the total length of the respective cut edge surface.

13. The method as recited in claim 1, wherein the at least one main face includes two opposite main faces, the precoated steel sheet including a peripheral edge extending from a first of the two opposite main faces to a second of the two opposite main faces, the cut edge surface extending from the first of the two opposite main faces to the second of the two opposite main faces over an entire height of the peripheral edge.

14. A method for manufacturing a welded blank, comprising the steps of:
   producing a first and a second precoated steel sheet, the first and the second precoated steel sheets being produced using the method according to claim 1;
   butt welding the first and the second precoated steel sheets so as to create a weld joint between the precoated steel sheets and thus obtain a welded blank, the butt welding step including a step of arranging the first and second precoated steel sheets in such a manner that the reduced-aluminum zone of at least one of the precoated steel sheets faces an edge of the other precoated steel sheet.

15. The method according to claim 14, wherein the welding is a laser welding operation.

16. The method according to claim 14, further comprising, prior to the butt welding step, a step of removing, for each of the first and second precoated steel sheets, the metallic alloy layer in a removal zone adjacent to a reduced-aluminum zone of the respective precoated steel sheet and wherein, during the butt welding step, the precoated steel sheets are welded at their edges where the metallic alloy layer has been removed.

17. The method according to claim 16, wherein the removal of the metallic alloy layer is performed using a laser beam.

18. The method according to claim 16, wherein, during the removal step, the intermetallic alloy layer is left in the removal zone over at least a portion of its height.

19. The method according to claim 16, further comprising, after the step of laser cutting, a step of removing, for each of the first and second precoated steel sheets, the metallic alloy layer in a removal zone adjacent to a reduced-aluminum zone of the respective precoated steel sheet.

20. The method according to claim 14, wherein the laser welding is performed using a filler wire or powder addition.

21. The method according to claim 20, wherein the filler wire or powder contains austenite-forming alloying elements.

22. The method according to claim 14, wherein, during the butt-welding step, the first and second precoated steel sheets are arranged in such a manner that the reduced-aluminum zone of at least one of the precoated steel sheets faces a reduced-aluminum zone of the other precoated steel sheet.

23. A method for manufacturing a press-hardened steel part comprising the successive steps of:
   carrying out the method according to claim 14 in order to obtain a welded blank;
   heating the welded blank so as to obtain an at least partly austenitic structure in the precoated steel sheets forming the welded blank;
   hot forming the welded blank in a press to obtain a press-formed steel part; and
   cooling the steel part in the press so as to obtain the press-hardened steel part.

24. A method for manufacturing a steel part according to claim 23, wherein the cooling rate is equal to or greater than a critical martensitic or bainitic cooling rate of the steel sheets.

25. A precoated steel sheet comprising:
   a steel substrate portion having, on at least one face, a precoating portion, the precoating portion including an intermetallic alloy layer portion and a metallic alloy layer portion extending atop the intermetallic alloy layer portion, the metallic alloy layer portion being a layer of aluminum, a layer of aluminum alloy or a layer of aluminum-based alloy, a thickness of the precoated steel sheet being comprised between 1 mm and 5 mm, and
   at least one laser cut edge surface extending between the faces of the precoated steel sheet and comprising a substrate region and at least one precoating region,
   the precoated steel sheet comprising, on the laser cut edge surface, a plurality of solidification striations, and
   the laser cut edge surface comprises a reduced-aluminum zone, extending over an entire height of the laser cut edge surface and over a length smaller than or equal to a length of the laser cut edge surface, a surface fraction of aluminum on the substrate region of the reduced-aluminum zone being comprised between 0.3% and 6%,
   the precoating region including a portion of the intermetallic alloy layer portion and a portion of the metallic alloy layer portion,
   the at least one main face includes two opposite main faces, the precoated steel sheet including a peripheral edge extending from a first of the two opposite main faces to a second of the two opposite main faces, the cut edge surface extending from the first of the two opposite main faces to the second of the two opposite main faces over an entire height of the peripheral edge.

26. The precoated steel sheet according to claim 25, wherein the reduced-aluminum zone extends over the entire length of the cut edge surface.

27. The precoated steel sheet according to claim 25, wherein the length of the reduced-aluminum zone is strictly smaller than the total length of the cut edge surface.

* * * * *